3,453,282
NOVEL 4'-AMINOETHOXY-2,2,4-TRIALKYL-
Δ³-ISOFLAVEN COMPOUNDS
Horace Albert De Wald, Ann Arbor, Mich., assignor to
Parke, Davis & Company, Detroit, Mich., a corporation
of Michigan
No Drawing. Filed Dec. 27, 1965, Ser. No. 516,762
Int. Cl. C07d 99/04, 7/20; A61k 27/00
U.S. Cl. 260—294.7                           5 Claims

ABSTRACT OF THE DISCLOSURE

This invention relates to novel heterocyclic compounds and to means for producing the same. More particularly, the invention relates to novel 4'-aminoethoxy-2,2,4-trialkyl-Δ³-isoflaven compounds and acid addition salts thereof which in free base form have the formula:

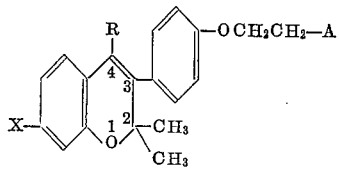

where R is a lower alkyl group (i.e., an alkyl group containing 1 to 3 carbon atoms), X is hydrogen or a chlorine or bromine atom, and A is a lower dialkylamino, morpholino, pyrrolidino or piperidino group or a methyl substituted pyrrolidino or piperidino group. These compounds are useful agents in lowering blood cholesterol and are useful antibacterial agents.

---

In accordance with the invention the specified isoflaven compounds are produced by condensing a 4'-hydroxy-2,2,4-trialkyl-Δ³-isoflaven compound of formula:

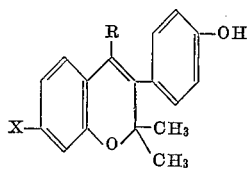

in the presence of a base with a β-aminoethyl halide compound Hal—CH₂CH₂A; where A, R and X have the above-mentioned significance and Hal is a chlorine, bromine or iodine atom. In carrying out the condensation, it is ordinarily satisfactory to employ equimolar quantities of the reactants and the base. It is preferred, however, to employ a slight excess of the base and a moderate to large excess of the β-aminoethyl halide reactant. A solvent is ordinarily employed for the reaction. Any of various solvents can be used such as water; lower alkanols; ether, such as diethyl ether, dioxane, tetrahydrofuran and diethylene glycol dimethyl ether; hydrocarbons such as benzene and toluene; tertiary amides such as N-methyl-2-pyrrolidone and dimethylformamide; as well as miscible mixtures of such solvents. A preferred solvent is dimethylformamide. As a base for the condensation, alkali metal hydroxides, alkoxides and hydrides may be used. When using dimethylformamide as a solvent, sodium hydride is a preferred base. In general, hydrides are preferred for use with nonhydroxylic solvents.

The reaction temperature and reaction time are not critical and may be varied widely. For example, with sodium hydride and dimethylformamide the reaction is complete in periods ranging from 1 to 24 hours at reaction temperatures ranging from about 20–125° C. Preferred conditions using sodium hydride and dimethylformamide are temperatures in the range from about 80–120° C. for 2 to 4 hours.

The products of the invention have useful pharmacological properties. In particular, when used in standard tests in rats they are active by the oral route in lowering the blood cholesterol level at well tolerated doses, e.g., at 25 mg./kg. once daily for seven days. Thus, the products have application as oral agents in the treatment of hypercholesteremia. The products further possess antibacterial products in vitro and therefore are useful as antibacterial agents. The products are also useful as intermediates for the production of other chemical products.

The free base products of the invention form acid addition salts by reaction with organic and inorganic acids. Somes examples of acid addition salts of the invention are inorganic acid salts such as the hydrochloride, hydrobromide, hydroiodide, sulfate and phosphate, and organic acid salts such as the carbonate, succinate, benzoate, acetate, citrate, malate, maleate, p-toluenesulfonate, benzenesulfonate and sulfamate. The acid addition salts are conveniently formed by mixing the free base with at least an equivalent amount of the acid in a solvent in which the salt is insoluble, particularly after chilling, thereby permitting recovery of the desired salt as a solid phase. Whereas both the free base and salt forms of the product are useful for the purposes of the invention, the salts are generally preferred in those cases where solid and essentially neutral product forms, as well as increased water solubility, are desired. The invention contemplates the acid salts broadly. Those salts which are unsuited to particular uses, as for example uses where toxicity is a problem, are nevertheless useful as intermediates, being readily convertible to nontoxic acid salts by means which per se are known to those in the art.

The invention is illustrated by the following examples.

Example 1

(a) One gram of a 50% sodium hydride dispersion in mineral oil is added portionwise with stirring to a solution of 4.75 g. of 4'-hydroxy-2,2,4-trimethyl-Δ³-isoflaven in 50 ml. of dimethylformamide. A solution of N-(β-chloroethyl)pyrrolidine (prepared by basifying a solution of 12 g. of the hydrochloride salt and extracting the liberated base) in 250 ml. of ether is added and the temperature of the reaction mixture is raised to 90° C. by distillation of solvent. The mixture is stirred at 90° C. for 3 hours, cooled and diluted with 150 ml. of benzene. The mixture is washed with water, then with saturated aqueous sodium chloride, dried and evaporated at reduced pressure to give the product 2,2,4 - trimethyl-4'-(β-pyrrolidinoethoxy)-Δ³-isoflaven; M.P. 78–80° C. after recrystallization from methanol.

(b) The isoflaven starting material for the procedure of paragraph (a) can be obtained in several steps from known materials, as follows: A mixture of 22.8 g. of o-hydroxyacetophenone, 23.1 g. of p-methoxyphenylacetic acid, 22 ml. of triethylamine and 80 ml. of acetic anhydride is stirred and heated at reflux for 48 hours. The mixture is cooled and the product, 3-(p-methoxyphenyl)-4-methylcoumarin, removed by filtration; M.P. 185–188° C. after recrystallization from glacial acetic acid. A mixture of 27 g. of the latter product, 100 ml. of glacial acetic acid and 100 ml. of 48% hydrobromic acid is stirred and heated at reflux for 3 hours. The solution is cooled and the product, 3-(p-hydroxyphenyl)-4-methylcoumarin, removed by filtration and dried; M.P. 243–248° C. A solution of 12.8 g. of this product in 75 ml. of benzene is added rapidly dropwise to an ethereal soltuion of methyl magnesium iodide, prepared from 6.0 g. of magnesium turnings and 35 g. of methyl iodide in 100 ml. of ether. The mixture is stirred and heated at reflux for 16 hours and then decomposed by the addition of 100 ml. of saturated aqueous ammonium chloride. The organic layer is separated, washed with saturated aqueous sodium chloride, dried and evaporated to give 3-(p-hydroxyphenyl)-4-(o-hydroxyphenyl)-2-methyl-3-penten-2-ol; M.P. 134–136° C. after recrystallization from benzene-petroleum ether. To a solution of 8.2 g. of the latter product in 250 ml. of benzene is added 3 drops of 48% hydrobromic acid. The solution is heated at boiling for 20 minutes, cooled, dried and evaporated at reduced pressure to give 4'-hydroxy-2,2,4-trimethyl-$\Delta^3$-isoflaven; M.P. 152–154° C. after recrystallization from benzene. The corresponding 4-ethyl- and 4-propyl-4'-hydroxy - 2,2 - dimethyl-$\Delta^3$-isoflaven starting materials can be prepared by the same procedure of paragraph (b) by replacing the acetophenone with o-hydroxypropiophenone and o-hydroxybutyrophenone, respectively. The intermediate products and their melting points (except as noted) are the following:

|  | 4-ethyl (° C.) | 4-propyl (° C.) |
| --- | --- | --- |
| 3-(p-methoxyphenyl)coumarin | 166–168 | 152–154 |
| 3-(p-hydroxyphenyl)coumarin | 236–248 | 203–206 |
| 3-(p-hydroxyphenyl)-4-(o-hydroxyphenyl)-2-methyl 3-alken-2-ol | [1] Hexene | [1] Heptene |
| 4'-hydroxy-2,2-dimethyl-$\Delta^3$-isoflaven | 164–166 | 123–125 |

[1] Obtained in impure form, sufficient however for use as an intermediate.

(c) By the same procedure of paragraph (a) but replacing the isoflaven starting material with an equivalent amount of 4-ethyl-4'-hydroxy-2,2-dimethyl-$\Delta^3$-isoflaven or 4-propyl-4'-hydroxy - 2,2 - dimethyl-$\Delta^3$-isoflaven, one obtains as the free base product 4-ethyl-2,2-dimethyl-4'-($\beta$-pyrrolidinoethoxy)-$\Delta^3$-isoflaven or 4-propyl-2,2-dimethyl-4'-($\beta$-pyrrolidinoethoxy)-$\Delta^3$-isoflaven. The corresponding citrate salts obtained by treating an acetone solution of the free base with an equivalent of citric acid and recovering the solid product which separates melt at 110–112° and 75–78° C., respectively. The salt of the latter free base is obtained at the monohydrate.

Also by the same procedure using these 4-ethyl- or 4-propyl-isoflaven starting materials but replacing N-($\beta$-chloroethyl)pyrrolidine with an equivalent amount of 1-($\beta$-chloroethyl)piperidine or $\beta$-dimethylaminoethyl chloride, respectively, one obtains as the product 4-ethyl-2,2-dimethyl-4'-($\beta$-piperidinoethoxy)-$\Delta^3$-isoflaven or 4'-($\beta$-dimethylaminoethoxy)-2,2-dimethyl-3-propyl-$\Delta^3$-isoflaven.

Example 2

(a) 1.5 grams of a 50% sodium hydride dispersion in mineral oil is added portionwise to a solution of 7.5 g. of 7 - chloro - 4' - hydrovy-2,2,4-trimethyl-$\Delta^3$-isoflaven in 75 ml. of dimethylformamide. A solution of 1-($\beta$-chloroethyl)pyrrolidine (prepared by basifying 17 g. of the hydrochloride in 200 ml. of ether and extracting the liberated base) is added and the reaction mixture is heated and then following reaction worked up as in Example 1 (a). The product is 7-chloro-2,2,4-trimethyl-4'-($\beta$-pyrrolidinoethoxy)-$\Delta^3$-isoflaven; M.P. 103–105° C. after recrystallization from methanol. The hydrobromide salt is obtained by treating an ethreal solution of the free base with one equivalent of hydrogen bromide in isopropyl alcohol. The sulfuric acid salt is obtained by dissolving the free base in ethanol containing an equimolar quantity of sulfuric acid and recovering the precipitate by filtration and recrystallization from isopropanol.

(b) The isoflaven starting material for the procedure can be obtained in several steps from known materials, as follows: 26 g. of 4-chloro-2-hydroxyacetophenone, 26 g. of p-methoxyphenylacetic acid, 22 ml. of triethylamine and 80 ml. of acetic anhydride are reacted at reflux and the reaction mixture worked up to give 7-chloro-3-(p-methoxyphenyl)-4-methylcoumarin; M.P. 136–139° C. after recrystallization from glacial acetic acid. 22 g. of the product is demethylated at reflux using 150 ml. of glacial acetic acid and 125 ml. of 48% hydrobromic acid. The product obtained by filtration after cooling is 7-chloro-3-(p-hydroxyphenyl)-4-methylcoumarin; M.P. 235° C. after recrystallization from glacial acetic acid.

A solution of 10 g. of the product in 125 ml. of benzene is added dropwise to a solution of methyl magnesium iodide (prepared from 4.8 g. of magnesium turnings and 28 g. of methyl iodide in 100 ml. of ether). The mixture is heated at reflux overnight and then decomposed with aqueous ammonium chloride. The organic layer is washed, dried and concentrated to give the product 4-(4-chloro-2-hydroxyphenyl)-3-(p-hydroxyphenyl)-2-methyl - 3 - penten-2-ol; M.P. 150–152° C. after recrystallization from benzene. A benzene solution of 7.0 g. of the product is treated with 3 drops of 48% hydrobromic acid, heated at boiling for 20 minutes and then cooled and concentrated. The residual product is 7-chloro-4'-hydroxy-2,2,4-trimethyl-$\Delta^3$-isoflaven; M.P. 139–141° C. after recrystallization from benzene-petroleum ether.

The corresponding 4-ethyl- or 4-propyl-7-chloro-4'-hydroxy-2,2-dimethyl-$\Delta^3$-isoflaven starting materials can be prepared by the same procedure of paragraph (b) by replacing 4-chloro-2-hydroxyacetophenone with an equivalent amount of 4-chloro-2-hydroxypropiophenone or 4-chloro-2-hydroxybutyrophenone. The intermediate products and their melting points (except as noted) are the following:

|  | 4-ethyl (° C.) | 4-propyl (° C.) |
| --- | --- | --- |
| 7-chloro-3-(p-methoxyphenyl)-coumarin | 112–114 | 170–172 |
| 7-chloro-3-(p-hydroxyphenyl)-coumarin | 220–227 | 148–153 |
| 4-(4-chloro-2-hydroxyphenyl)-3-(p-hydroxyphenyl)-2-methyl-3-alken-2-ol | [1] Hexene | [1] Heptene |
| 7-chloro-4'-hydroxy-2,2-dimethyl-$\Delta^3$-isoflaven | 132–135 | 128–131 |

[1] Obtained in impure form sufficient for use as an intermediate.

(c) By the same procedure of paragraph (a) but replacing the 7-chloro-isoflaven starting material with an equivalent amount of 7-chloro-4-ethyl-4'-hydroxy-2,2-dimethyl-$\Delta^3$-isoflaven or 7-chloro-4'-hydroxy-2,2-dimethyl-4-propyl-$\Delta^3$-isoflaven, one obtains as the free base product 7-chloro-4-ethyl-2,2-dimethyl-4' - ($\beta$ - pyrrolidinoethoxy)-$\Delta^3$-isoflaven (M.P. as the citrate, 80° C. d) or 7-chloro-2,2-dimethyl-4-propyl-4'-($\beta$-pyrrolidinoethoxy) - $\Delta^3$ - isoflaven (M.P. 98–100° C. from methanol).

Also by the same procedure using the 4-methyl- or 4-ethyl-7-chloro-4'-hydroxy - 2,2 - dimethyl - $\Delta^3$ - isoflaven starting material but replacing N-($\beta$-chloroethyl)pyrrolidine with an equivalent amount of $\beta$-diethylaminoethyl chloride or 1-($\beta$-chloroethyl)morpholine, respectively, one obtains as the product 7-chloro-4'-($\beta$-diethylaminoethoxy)-2,2,4-trimethyl-$\Delta^3$-isoflaven or 7-chloro-4-ethyl-2,2-dimethyl-4'-($\beta$-morpholinoethoxy)-$\Delta^3$-isoflaven.

Example 3

(a) One gram of a 50% sodium hydride dispersion in mineral oli is added portionwise with stirring to a solution of 6.9 g. of 7-bromo-4'-hydroxy-2,2,4-trimethyl-$\Delta^3$-isoflaven in 75 ml. of dimethylformamide. A solution of 1-($\beta$-chloroethyl)pyrrolidine (prepared by basifying a solution of 12 g. of the hydrochloride salt and extracting the liberated base) in 200 ml. of ether is added and the temperature of the mixture raised to 90° C. by distillation of solvent. The mixture is stirred at this temperature for 3 hours, cooled and diluted with 150 ml. of benzene. The resulting mixture is washed with water, then with saturated aqueous sodium chloride, dried and evaporated to give the desired product, 7-bromo-2,2,4-trimethyl-4'-($\beta$-pyrrolidinoethoxy)-$\Delta^3$-isoflaven; M.P. 101–105° C. after recrystallization from benzene-petroleum ether.

(b) The 7-bromo isoflaven starting material for the procedure of paragraph (a) can be obtained in several steps from known materials, as follows: A mixture of 32.3 g. of 4-bromo-2-hydroxyacetophenone, 26 g. of p-methoxyphenylacetic acid, 22 ml. of triethylamine and 80 ml. of acetic anhydride is stirred and heated at reflux for 48 hours. The mixture is cooled and the product, 7-bromo-3-(p-methoxyphenyl) - 4 - methylcoumarin, removed by filtration; M.P. 124–126° C. after recrystallization from glacial acetic acid. A mixture of 34 g. of the latter product, 150 ml. of glacial acetic acid and 120 ml. of 48% hydrobromic acid is stirred and heated at reflux for 3 hours. The solution is cooled and the product, 7-bromo-3-(p-hydroxyphenyl) - 4 - methylcoumarin, removed by filtration and dried; M.P. 240–245° C. after recrystallization from glacial acetic acid.

A solution of 28.6 g. of this product in 100 ml. of benzene is added rapidly dropwise to a solution of methyl magnesium iodide prepared from 10 g. of magnesium turnings and 56 g. of methyl iodide in 150 ml. of ether. The mixture is stirred and heated at reflux for 16 hours and then decomposed by addition of saturated aqueous ammonium chloride. The organic layer is separated, washed with saturated aqueous sodium chloride, dried and concentrated by removal of solvent. The residual product is 4-(4-bromo-2-hydroxyphenyl)-3 - (p - hydroxyphenyl)-2-methyl-3-penten-2-ol. Hydrobromic acid (48%, 3 drops) is added to a solution of 28 g. of the latter product in benzene. The mixture is heated at boiling for 20 minutes, cooled, dried and evaporated to give 7-bromo-4'-hydroxy-2,2,4-trimethyl-$\Delta^3$-isoflaven; M.P. 122–124° C. after recrystallization from benzene ether.

The corresponding 7-bromo-4-ethyl-4'-hydroxy-2,2-dimethyl-$\Delta^3$-isoflaven starting material can be prepared by the same stepwise procedure: 4-bromo-2-hydroxypropiophenone is reacted with p-methoxyphenylacetic acid, the resulting 7-bromo-4-ethyl-3-(p - methoxyphenyl)coumarin (M.P. 168–171° C., glacial acetic acid) is demethylated using hydrobromic acid, the resulting 7-bromo-4-ethyl-3-(p-hydroxyphenyl)coumarin (M.P. 195–199° C., glacial acetic acid) is reacted with methyl magnesium iodide to give 4-(4-bromo-2-hydroxyphenyl)-3-(p-hydroxyphenyl)-2-methyl-3-hexen-2-ol and the latter is cyclized to give 7-bromo-4-ethyl-4'-hydroxy-2,2 - dimethyl - $\Delta^3$ - isoflaven (M.P. 144–144° C., benzene-petroleum ether).

(c) By substituting in place of the isoflaven starting material of the procedure of paragraph 3(a) an equivalent amount of 7-bromo-4-ethyl-4'-hydroxy-2,2-dimethyl-$\Delta^3$-isoflaven, one obtains as the product 7-bromo-4-ethyl-2,2-dimethyl-4'-($\beta$-pyrrolidinoethoxy)-$\Delta^3$ - isoflaven, M.P. 69–71° C. after recrystallization from methanol. However, using in this procedure the same isoflaven starting material but substituting for 1-($\beta$-chloroethyl)pyrrolidine an equivalent quantity of 1-($\beta$-chloroethyl) - 2,6 - dimethylpiperidine, the resulting product is 7-bromo-4'-[$\beta$-(2,6-dimethylpiperidino)ethoxy]-2,2,4-trimethyl-$\Delta^3$-isoflaven.

I claim:
1. A member selected from the group consisting of a free base having the formula:

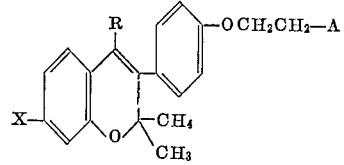

and its acid addition salts; where R is a lower alkyl group, X is a member selected from the group consisting of hydrogen, chlorine and bromine atoms, and A is a member selected from the group consisting of lower dialkylamino, morpholino, pyrrolidino, piperidino and methyl substituted pyrrolidino and piperidino.

2. A compound according to claim 1 where R is ethyl, X is hydrogen and A is pyrrolidino.

3. A compound according to claim 1 where R is propyl, X is hydrogen and A is pyrrolidino.

4. A compound according to claim 1 where R is ethyl, X is hydrogen and A is piperidino.

5. A compound according to claim 1 where R is propyl, X is hydrogen and A is dimethylamino.

References Cited
UNITED STATES PATENTS 3,340,277  9/1967  Carney et al. _____ 260—345.8

R. T. BOND, *Primary Examiner.*

H. R. JILES, *Assistant Examiner.*

U.S. Cl. X.R.

260—247.74, 326.5, 345.2; 424—267